United States Patent
Saitou et al.

(10) Patent No.: US 8,050,718 B2
(45) Date of Patent: Nov. 1, 2011

(54) WIRELESS BASE STATION

(75) Inventors: Naoyuki Saitou, Kawasaki (JP);
Chiyoshi Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 834 days.

(21) Appl. No.: 12/028,500

(22) Filed: Feb. 8, 2008

(65) Prior Publication Data

US 2008/0214124 A1 Sep. 4, 2008

(30) Foreign Application Priority Data

Mar. 1, 2007 (JP) .................................. 2007-51724

(51) Int. Cl.
*H04M 1/00* (2006.01)
*H04B 1/38* (2006.01)
(52) U.S. Cl. ....................................................... 455/561
(58) Field of Classification Search .................... 455/561
See application file for complete search history.

(56) References Cited

U.S. PATENT DOCUMENTS

| | | | | |
|---|---|---|---|---|
| 6,058,317 A | * | 5/2000 | Posti | 455/561 |
| 2001/0008518 A1 | | 7/2001 | Atsuta | |

FOREIGN PATENT DOCUMENTS

| | | |
|---|---|---|
| EP | 1713290 A1 * | 10/2006 |
| JP | 07-074729 | 3/1995 |
| JP | 2000-013349 | 1/2000 |
| JP | 2000-078176 | 3/2000 |
| JP | 2001-197038 | 7/2001 |

* cited by examiner

*Primary Examiner* — Lewis West
(74) *Attorney, Agent, or Firm* — Staas & Halsey LLP

(57) ABSTRACT

The present invention utilizes a wireless base station having a first radio transceiver and a second radio transceiver connected to the first radio transceiver with a communication cable, a first baseband unit connected to the first radio transceiver with a communication cable, and a second baseband unit connected to the second radio transceiver with a communication cable.

11 Claims, 9 Drawing Sheets

Fig. 4 A
Fig. 4 B
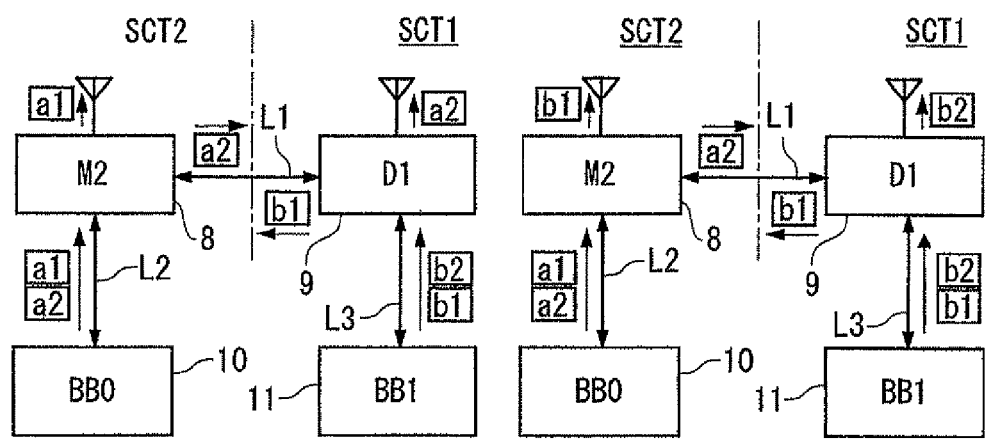
(BB0 in active status)  (BB1 in active status)
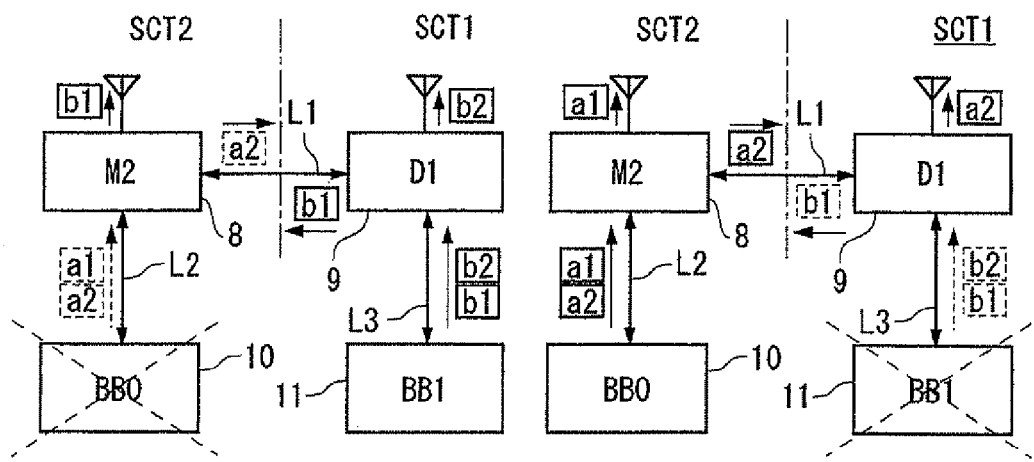
(BB0 indicating a failure)  (BB1 indicating a failure)
Fig. 4 C
Fig. 4 D

WIRELESS BASE STATION

CROSS-REFERENCE TO RELATED APPLICATIONS

This application is related to and claims priority to Japanese Application No. 2007-51724 filed Mar. 1, 2007 in the Japanese Patent Office, the contents of which are incorporated by reference herein.

BACKGROUND

1. Field of the Invention

The present invention relates to a wireless base station. The present invention is favorably adapted to a wireless base station having redundant radio transceivers (wireless devices) to provide radio communication service.

2. Description of the Related Art

An area served by a wireless base station in a mobile radio communication system is generally comprised of multiple sectors (three or six sectors, etc.). Recently, multi-antenna technology has become practical to use effectively. This multi-antenna technology requires a plurality of antennas and radio transceiver in addition to the sector construction of the previous technology. Moreover, "baseband unit" processing digital of signals is required for a plurality of the radio transceivers.

SUMMARY

A great number of cables, however, are required to connect baseband units and radio transceivers in a duplicated (redundant) system.

Therefore, one object of the present invention is to control the number of cables which connect radio transceivers to baseband units in the wireless base station.

The present invention utilizes a wireless base station having a first radio transceiver and a second radio transceiver connected to the first radio transceiver with a communication cable, a first baseband unit connected to the first radio transceiver with a communication cable, and a second baseband unit connected to the second radio transceiver with a communication cable.

These together with other aspects and advantages which will be subsequently apparent, reside in the details of construction and operation as more fully hereinafter described and claimed, reference being had to the accompanying drawings forming a part hereof wherein like numerals refer to like parts throughout.

BRIEF DESCRIPTION OF THE DRAWINGS

FIG. 4 is a block diagram showing an example of a basic operation (downward direction) according to the embodiment as described in FIG. 3.

DETAILED DESCRIPTION OF THE PREFERRED EMBODIMENTS

A preferred embodiment of the present invention will be explained with reference to accompanying drawings.

Figure 1:
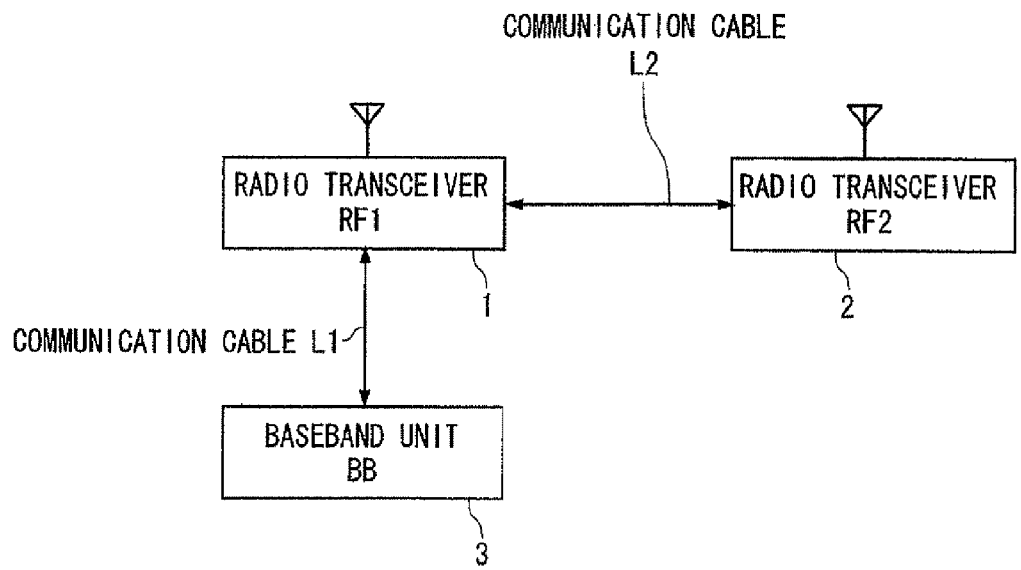
FIG. 1 is an embodiment of the wireless base station that uses a plurality of radio transceivers.
Figure 1:
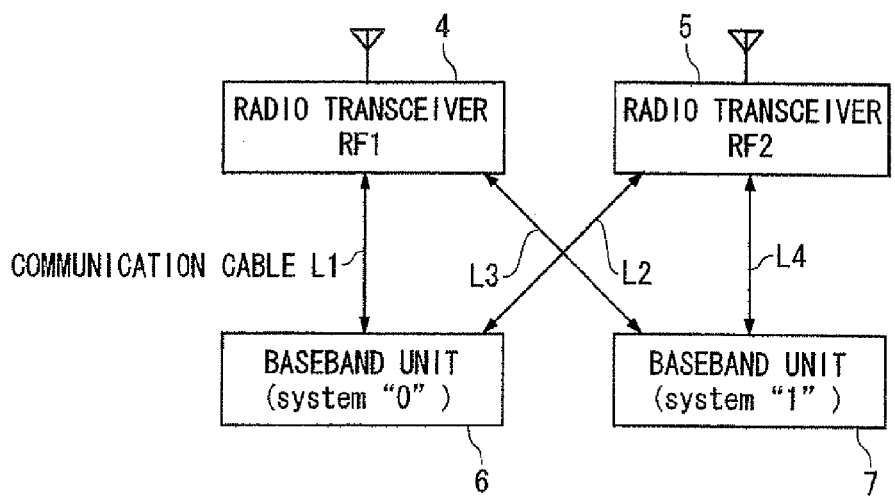

FIG. 1 shows a radio base station in case where a plurality of transceivers are used.

As shown in FIG. 1A, a baseband unit BB (3) is coupled to a radio transceiver RF1 (1) and a radio transceiver RF2 (2). The baseband unit BB (3) is connected to the radio transceiver RF1 (1) with a (preferably, single) cable to form a bi-directional communication path L1. A radio transceiver RF1 (1) is connected to the radio transceiver RF2 (2) with a (preferably, single) cable to form a bi-directional communication path L2.

As described above, when a plurality of radio transceivers (RF1 (1) and RF2 (2)) are serially connected to the baseband unit BB (3), if a failure occurs in the radio transceiver RF1 (1), for example, communication can not be performed between the baseband unit BB (3) and the radio transceiver RF2, when the failure is spread to a transferring function of transceiver RF1 (1), even though the radio transceiver RF2 (2) can operate normally.

The example shown in FIG. 1B solves the problem caused by the serial connection explained above. In the case where a baseband unit is redundantly constructed, a baseband unit 6 (system 0) and a baseband unit 7 (system 1) are provided. Also, as described in the FIG. 1B, each baseband unit (6, 7) is connected to the radio transceiver RF1 (4) and EF2 (7) with communication cables L1 and L2 (L3 and L4) to form bi-directional communication paths.

However, since each baseband unit is connected to each one of radio transceivers in the example shown in the FIG. 1B, the total number of cables is increased. Accordingly, more time is required for wiring processing, and the space provided for each device needs to be increased. With that, the following embodiment is provided.

Figure 2:
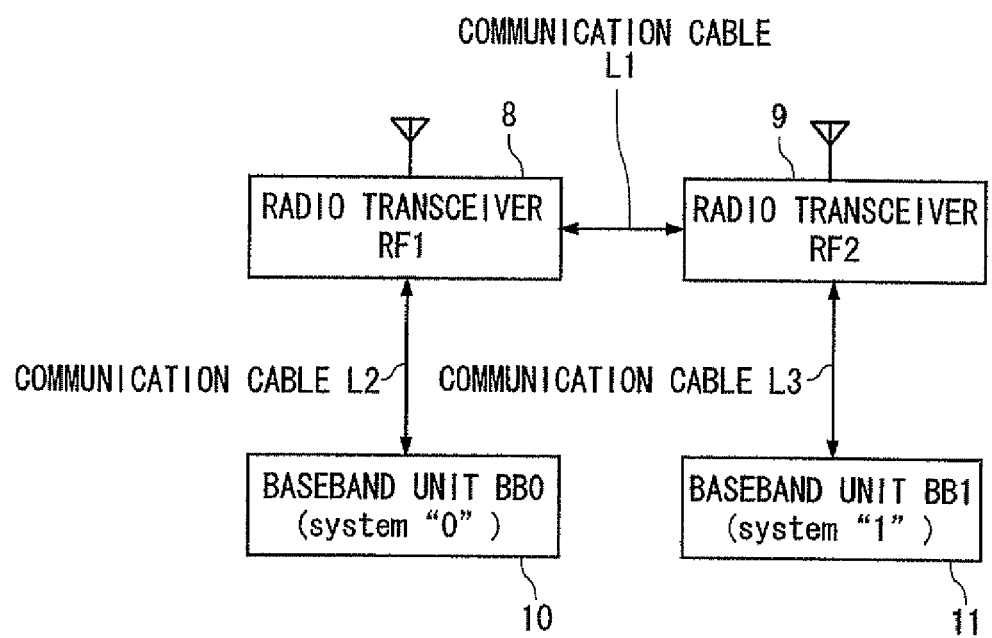
FIG. 2 is a block diagram showing a basic construction example of a wireless base station that relates to the present invention.

Basic Construction Example (FIG. 2)

FIG. 2 shows a basic construction example of the wireless base station. In the wireless base station, a radio transceiver (radio device) RF1 (8) is connected to a radio transceiver RF2 (9) having a redundant construction with a communication cable L1 (e.g., an optical cable) to form a bi-directional communication path. The radio transceiver RF1 (8) is connected to a baseband unit BB0 (10) of system 0 to form a bi-directional communication path with a communication cable L2 (e.g., an optical cable). Likewise, the radio transceiver RF2 (9) is connected to a baseband unit BB1 (11) of system 1 to from a bi-directional communication path with a communication cable L3 (e.g., an optical cable).

In a basic construction example in FIG. 2, the radio transceiver RF1 (8) and RF2 (9) can be placed to correspond to the same sector (cells), or also can be placed in different sectors (cells).

When the radio transceiver RF1 (8) and RF2 (9) are placed to correspond to the same sector, the relationship between RF1 (8) and RF2 (9) may be redundant. That is, the radio transceiver RF1 (8) operates as an active radio transceiver and transmits a signal to the sector that was received from the baseband unit BB0 (10). When there is a disconnection or the like on the cable L2, the radio transceiver RF1 (8) is able to receive a signal from the baseband unit BB1 (11) via the radio transceiver RF2 (9), and then transmit the received signal to the sector.

The radio transceiver RF2 (9) operates as a standby radio transceiver and receives a signal from the baseband unit BB1 (11). Also, if the radio transceiver RF1 (8) is not able to send a signal to a sector, the radio transceiver RF2 (9) transmits the signal from the baseband unit BB1 (11) to the same sector on behalf of the radio transceiver RF1 (8). Since the radio transceiver RF2 (9) is able to receive an output signal of the baseband unit BB0 (10) from the radio transceiver RF1 (8), the radio transceiver RF2 (9) is able to receive the signal from the baseband unit BB0 (10) via the radio transceiver RF1 (8) and transmit the received signal to the sector if there is a disconnection on the cable L3.

When the radio transceiver RF1 (8) and RF2 (9) are able to obtain signals through a plurality of paths, a signal through the shortest path may be used and transmitted preferentially. This is because it is considered that signal deterioration is little and there is less delay for the signal through the shortest path.

When there is a failure in transfer function of the radio transceiver RF1 (8) and RF2 (9), etc., it is possible to use a signal that is directly obtained from the baseband unit (BB0 (10), BB1 (11)) through the cable L2, L3 or the like.

When the radio transceivers RF1 (8) and RF2 (9) correspond to different sectors, the radio transceiver RF1 (8) sends a part of the output signal from the baseband unit BB0 (10) to the first sector, and transfers the rest of the output signal to the radio transceiver RF2 (9). On the contrary, the radio transceiver RF2 (9) transmits a part of the output signal from the baseband unit BB1 (11) to the second sector, and transfers the rest of the output signal to the radio transceiver RF1 (8).

Figure 3:
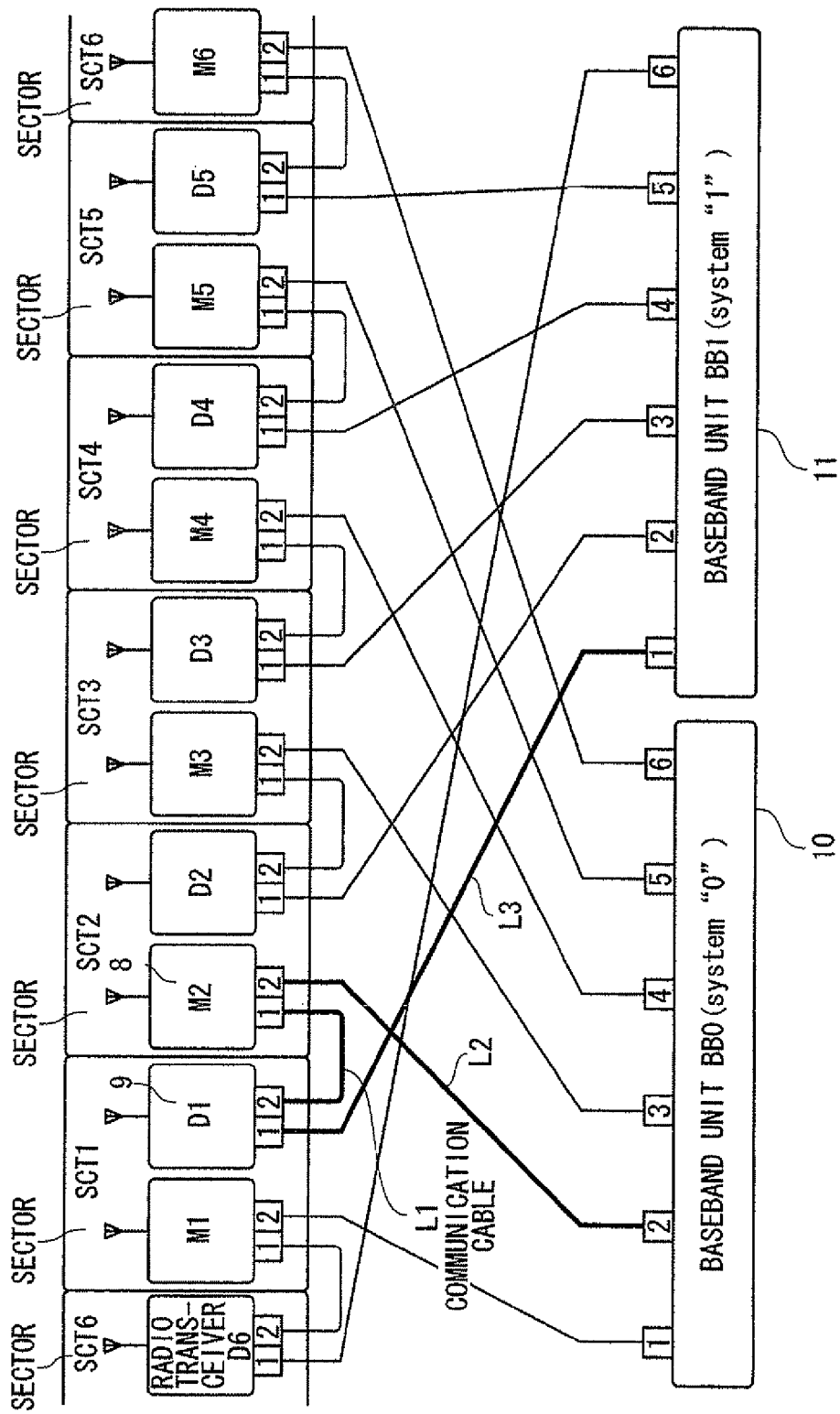
FIG. 3 is a block diagram showing an embodiment of a wireless base station that relates to the present invention.

Embodiment (FIG. 3)

In the embodiment of the wireless base station shown in FIG. 3, the service area is exemplarily divided into six sectors, SCT1 to SCT6. Each sector is provided with two radio transceivers (D6, M1, D1, M2, D2, M3, D3, M4, D4, M5, D5, M6), one of which is redundant to the other. Also, either of the radio transceivers is connected to a radio transceiver of the adjacent sector with e.g., a (preferably, single) communication cable, and is also connected to either of the baseband units of system 0 (10) or system 1 (11).

For example, in the example shown with heavy lines in FIG. 3, a radio transceiver D1 (9) in a sector SCT1 is connected, with the cable L1, to a radio transceiver M2 (8) in a sector SCT2, which is adjacent to the sector SCT1. The radio transceiver M2 (8) is also connected to the baseband unit BB0 (10) of system 0 with the cable L2. The radio transceiver D1 (9) is also connected to the baseband unit BB1 (11) of system 1 with the cable L3.

The connection form described above makes it possible to maintain redundancy in the following situations.

That is, when there is a failure in the radio transceiver M1 of the sector SCT1, the radio transceiver D1 (9) transmits a radio signal to the sector SCT1. An original signal for the radio signal transmitted to the sector STC1 can be obtained from either the baseband unit BB1 (11) or the baseband unit BB0 (10) (via the radio transceiver M2 (8)).

On the other hand, if a pair directly connecting the radio transceivers is placed in the same sector, the standby radio transceiver depends on a signal from the baseband unit, which is directly connected because the transfer function can also be in a failure state when the active radio transceiver is in a failure state.

Since a transmission interruption of radio signals within one sector means a service interruption of the entire sector, it is preferable that the protection is strong (the redundancy is adequately secured).

Basic Operation of the Embodiment (Downward Direction): (FIG. 4)

FIG. 4 shows a basic operation of the relations of connection between the radio transceiver M2 (8) and D1 (9), and the baseband unit BB0 (10) and BB1 (11).

First of all, when the baseband unit BB0 (10) shown in FIG. 4A is in active state, the radio transceiver M2 (8) receives a downward direction signal "a1" which is transmitted to M2 (8) itself (in its own sector STC2). The radio transceiver M2 (8) also receives a downward direction signal "a2" which is transmitted to the radio transceiver D1 on the side of the other sector STC1 (e.g., an adjacent sector.). Of these two signals, the radio transceiver M2 (8) transfers the downward direction signal "a2" to the radio transceiver D1 (9) through the cable L1.

Likewise, the radio transceiver D1 (9) receives a downward direction signal "b2" from the baseband unit BB1 (11). The radio transceiver D1 (9) also receives a downward direction signal "b1" which is to be transmitted to the radio transceiver M2 (8) on the side of the other sector STC2, and transfers the downward direction signal "b1" to the transceiver M2 (8) through the cable L1.

In this case, since the baseband unit BB0 (10) is system 0 in an active state, the radio transceiver M2 (8) preferentially selects the downward direction signal "a1" from the downward direction signal "a1" which is transmitted to M2 (8) itself and the downward direction signal "b1" which is received from the radio transceiver D1 (9). The radio transceiver M2 (8) then transmits the signal "a1" to the mobile station (not shown in the figure) in the sector STC2.

On the other hand, as with the radio transceiver M2 (8), the radio transceiver D1 (9) receives the downward direction signal "b2" and the downward direction signal "a2" from the radio transceiver M2 (8). However, the baseband unit BB1 (11) corresponds to system 1, i.e., it is in a standby state, so that the baseband unit BB1 (11) selects the downward direction signal "a2" and then outputs "a2" as a transmission signal in the sector SCT1. The radio transceiver D1 (9) may stop the transmission since the raid transceiver D1 (9) is in a standby state.

Note that if the radio transceiver M2 (8) or the radio transceiver D1 (9) is in a standby state, a transceiver in the standby state can stop the transmission of the downward direction signal to the corresponding sector.

In case the baseband unit BB1 (11) of system 1 shown in FIG. 4B is in an active state, the radio transceiver D1 (9) is in an active state, and the radio transceiver M2 (8) is in a standby state. Contrary to the case shown in FIG. 4A, if the radio transceiver D1 (9) receives the downward direction signal "b2", which is to be transmitted to the sector SCT1, and the downward direction signal "a2" from the radio transceiver M2 (8), the radio transceiver unit (9) preferentially selects the downward direction signal "b2" and transmits "b2" as a transmission signal in the sector STC1.

Likewise, since the baseband unit BB0 (10) is in a standby state, the radio transceiver M2 (8) selects the downward direction signal "b1" to be transmitted in the sector SCT2 from the downward direction signal "a1" and the downward direction signal "b1" which is received from the radio transceiver D1 (9). The radio transceiver M2 (8) can stop the transmission of the downward direction signal to the corresponding sector since the radio transceiver M2 (8) in a standby state.

In case of FIGS. 4A, B as described above, both the baseband unit BB0 (10) and BB1 (11) are in normal condition, but FIG. 4C shows an operation in case a failure occurs in the baseband unit BB0 (10) of system 0.

In this case, the downward direction signal "a1" and "a2" from the baseband unit BB0 (10) are in the failure state. Thus, the downward direction signal "b1" from the transceiver D1 (9) is transmitted as a transmission signal in the sector SCT2.

On the other hand, in the radio transceiver D1 (9), since the downward direction signal "a2" from the radio transceiver M2 (8) shows the failure state of the baseband unit BB0 (10), the downward direction signal "b2", which is sent for the sector STC1, is transmitted as a transmission signal in the sector STC1.

The example shown in FIG. 4D shows the case in which there is a failure in the baseband BB1 (11). In this case, in contrast to the example shown in FIG. 4C, the radio transceiver D1 (9) receives only the downward direction signal "a2" as a normal signal from the radio transceiver M2 (8). The downward direction signal "a2" is transmitted as a transmission signal in the sector SCT1. The radio transceiver M2 (8) receives only the downward direction signal "a1", which is sent for the sector STC2 as a normal signal. The downward direction signal "a1" is transmitted as a transmission signal in the sector STC2.

Basic Operation of the Embodiment (Upward Direction): (FIG. 5)

Figure 5:
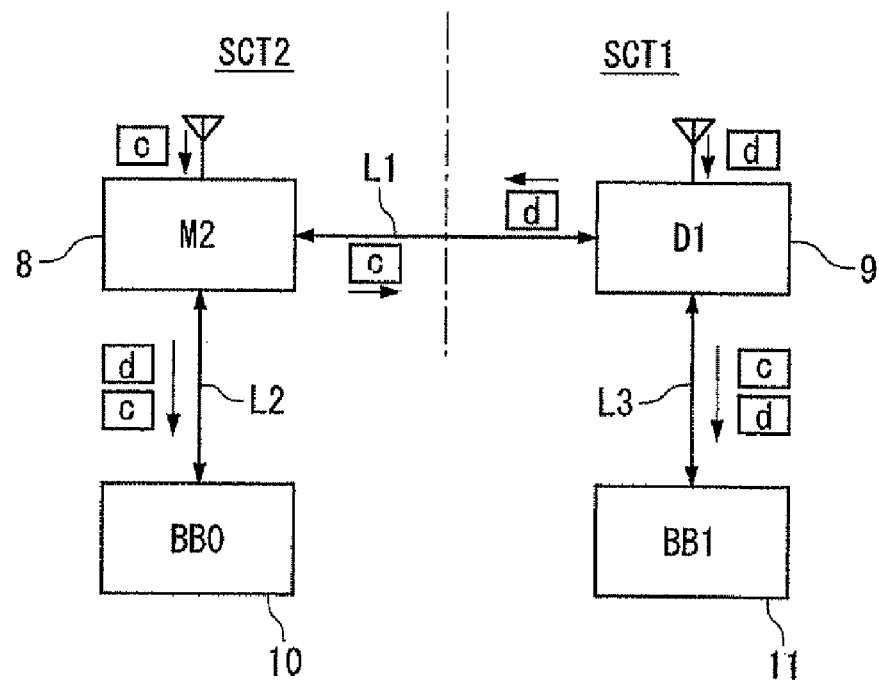
FIG. 5 is a block diagram showing a basic operation (upward direction) according to the construction example as described in FIG. 4.

The basic operation example of FIG. 4 described above shows downward directions in all operations, and upward directions are shown in FIG. 5. In contrast to the cases shown in FIG. 4A to C, the upward directions are common to all operations.

That is, when receiving an upward direction signal "c", the radio transceiver M2 (8) distributes the upward direction signal "c" to the baseband unit BB0 (10). The radio transceiver M2 (8) also distributes the upward direction signal "c" to the radio transceiver D1 (9).

The radio transceiver D1 (9) receives the distributed upward direction signal "c", and transmits the upward direction signal "C" to the baseband unit BB1 (11).

Likewise, the upward direction signal "d", which is received in the radio transceiver D1 (9), is distributed to the baseband unit BB1 (11) and to the baseband unit BB0(10).

Specific operations of the basic operation examples shown in FIG. 4 and FIG. 5 are shown in FIG. 6 to FIG. 9, respectively. Each of the operations is explained as follows.

Figure 6:
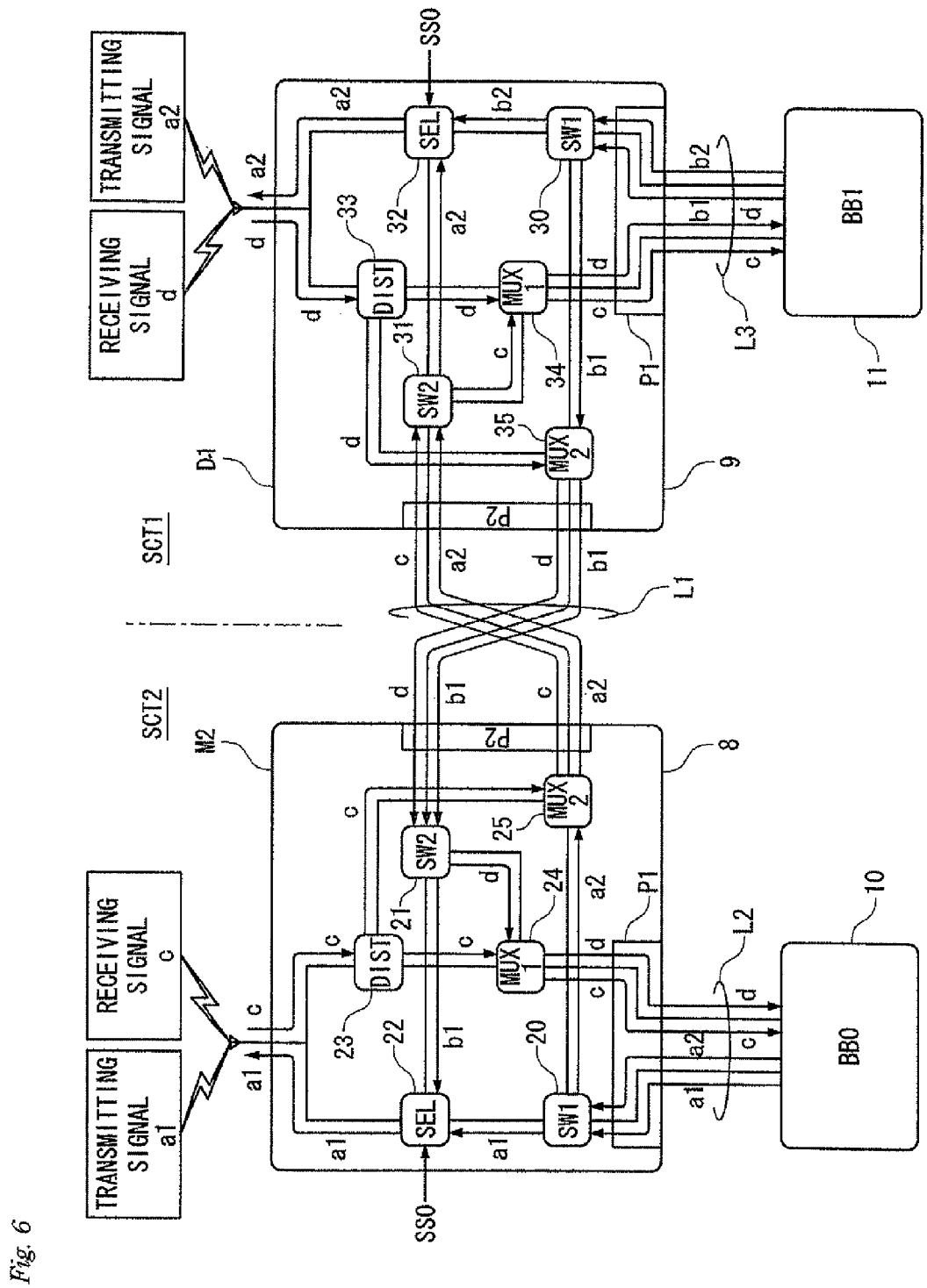
FIG. 6 is a block diagram showing an operation example (1) of system 0 baseband unit in an active state described in FIG. 4A.

Operation Example(1) (when the Baseband Unit BB0 of System 0 is in an Active State): FIG. 6

First of all, the operation example (1) corresponds to the basic operation example shown in FIG. 4A. That is, the radio transceivers (8, 9) are placed in different sectors. Based on the embodiment shown in FIG. 3, the radio transceiver D1 (9) on the sector SCT1 is connected to the baseband unit BB1 (11) of system 1, and the radio transceiver M2 (8) on the sector SCT2 is connected to the baseband unit BB0 (10) of system 0.

Each of the radio transceivers M2 (8) and D1 (9) include a selector SEL (22, 32), a switch SW1 (20, 30) and SW2 (21, 31), a multiplexing unit MUX1 (24, 34) and MUX2 (25, 35), and a distributing unit DIST (23, 33), respectively. The radio transceiver M2 (8) is provided with a system 0 operation signal SS0, and the radio transceiver D1 (9) is also provided with a system 0 operation signal SS0. Accordingly, the radio transceiver M2 (8) is set to the active state and D1 (9) is set to the standby state. In this case, providing the operation signal SS0 to the selector SEL (22, 32) performs switching to active/standby of the radio transceiver M2 (8) and D1 (9).

An operation in each unit is explained as follows.

(i) Description of Downward Direction:

First of all, with attention paid to the radio transceiver M2 (8), two downward direction signals, i.e., the downward direction signal "a1" and "a2" from the baseband unit BB0 (10) of system 0, are input through a cable L2. A1 and a2 are multiplexed by using FDM, TDM or the like.

The downward direction signal "a1" is a signal which is sent to the radio transceiver M2 (8), and the downward direction signal "a2" is a signal which is to be sent to the radio transceiver D1 (9) on the side of the other sector. The switch SW1 is used to switch a direction of the downward direction signal. A signal which is input to the switch SW1 from a port P1 through the cable L2 is the signal multiplexed with the signal "a1" and "a2". However, the switch SW1 (20) is set, in advance, to output the downward signal "a1" which is sent to its sector STC2, and to send the downward direction signal "a2" which is sent to the radio transceiver D1 (9) on the side of the other sector STC 1 to the multiplexing unit MUX2 (25). In this case, switching operation by the switch SW1 (20) is executed regardless of whether or not the radio transceiver M2 is in active.

When there is an input data disconnection, such as a disconnection of connection cable and occurrence of abnormalities, the SW1 (20) notifies the selector SEL (22) in the latter part and the multiplexing unit MUX2 (25) of the disconnection state. For example, the state notification may be information having one bit with the downward signal (a1, a2) or separately from the downward signal (a1, a2). In this case, however, both of the downward direction signals "a1" and "a2" are indicating the normal state.

In addition to the downward direction signal "a1" described above, the downward direction signal "b1" from the radio transceiver D1 (9) on the side of the other sector STC1 is input to the selector SEL 22. If both of the downward direction signals "a1" and "b1" indicate the normal state, the downward direction signal "a1" is preferentially selected and transmits the signal "a1" from the antenna to the sector STC2, as a transmission signal "a1", since the selector SEL 22 is currently set to select the downward direction signal "a1" by the system 0 operation signal SS0. As described later, however the selector SEL 22 selects and outputs the downward direction signal "b1" when the downward direction signal "a1" indicates the failure state.

As described above, the downward direction signal "a2", which is output from the switch SW1 (20), is sent to the multiplexing unit MUX2 (25). However, the multiplexing unit MUX2 (25) is given the upward direction signal "c" via the distributing unit DIST 23. The distributing unit DIST 23 distributes the upward direction signal "c" to two directions by sending the upward direction signal "c" received from the antenna to the multiplexing unit MUX2 (25), and also sending the same upward direction signal "c" to the other multiplexing unit MUX1 (24).

The multiplexing unit MUX2 (25) multiplexes the downward direction signal "a2" and the upward direction signal "c", and gives "a2" and "C" to a port P2 in the radio transceiver D1 (9) on the side of the other sector SCT1 through the cable L1 from the port P2. The port P2 in the radio transceiver M2 (8) is connected to the port P2 in the radio transceiver D1 with the cable L1 to form a bi-directional communication path.

The radio transceiver D1 (9) sends the multiplexed signal "a2" and "c" which are received in the port P2 from the radio transceiver M2 (8) to the switch SW2 (31). As with the switch SW1 (20) described above, the switch SW2 (31) is used to switch direction of the direction signals. That is, the switch SW2 (31) sends the downward direction signal "a2" to the selector SEL 32, the upward direction signal "c" to the multiplexing unit MUX1 (34).

The downward direction signal "b1" and "b2" are transmitted from the baseband unit BB1 (11) by using multiplexing via the cable L3 and the port P1, and then switched direction by the switch SW1 (30). Of the two signals, the downward direction signal "b2" is given to the selector SEL 32. On the other hand, the downward direction signal "b1" is given to the multiplexing unit MUX2 (35). Therefore, in addition to the downward direction signal "a2", the selector SEL 32 inputs the downward direction signal "b2" from the baseband unit BB1 (11).

Since the radio transceiver D1 (9) inputs the system 0 operation signal SS0, it performs the opposite operation of the selector SEL (22) in the radio transceiver M2 (8). The radio transceiver D1 (9) selects the downward direction signal from the switch SW2 (31), not the downward direction signal "b2" from the switch SW1 (30), that is, the downward direction signal "a2" which is sent from the baseband unit BB0 (10) via the radio transceiver M2 (8) on the operation side, and then outputs the signal "a2" as a transmission signal.

(ii) Description of Upward Direction:

On the other hand, in the radio transceiver M2 (8), the upward direction signal "c" which is distributed in the distributing unit DIST 23 is multiplexed with an upward direction signal "d" from the switch SW2 (21), and transmitted to the baseband unit BB0 (10) via the port P1 and the cable L2.

As in the radio transceiver D1 (9), the upward direction signal "d" is distributed in two directions. One direction is for the multiplexing unit MUX1 (34), and the other is for the multiplexing unit MUX2 (35). As described above, the multiplexing unit MUX1 (34) is given the upward direction signal "c", from the radio transceiver M2 (8). The radio transceiver M2 (8) is switched by the switch SW2 (31), so that the upward direction signal "c" and "d" are multiplexed and transmitted to the baseband unit BB1 (11) via the port P1 and the cable L3.

The upward direction signal "d", which is sent to the multiplexing unit MUX2 (35) from the distributing unit DIST (33), is multiplexed with the downward direction signal "b1" given by the switch SW1 (30). The upward direction signal "d" is then given to the switch SW2 (21) from the port P2 in the radio transceiver M2 (8) through the cable L1.

As described above, the switch SW2 (21) gives the downward direction signal "b1" to the selector SEL 22 and also gives the upward direction signal "d" to the multiplexing unit MUX1 (24).

By this means, as described in FIG. 4A, the downward direction signal "a1", which is transmitted from the baseband unit BB0 (10) of system 0, is transmitted from the radio transceiver M2 (8), as a transmission signal. The downward direction signal "a2" is transmitted as the transmission signal "a2" from the radio transceiver D1 (9) via the radio transceiver M2 (8). The upward direction signal "c" and "d" are both sent to the baseband unit BB0 (10) and BB1 (11) (Refer to FIG. 5).

Figure 7:
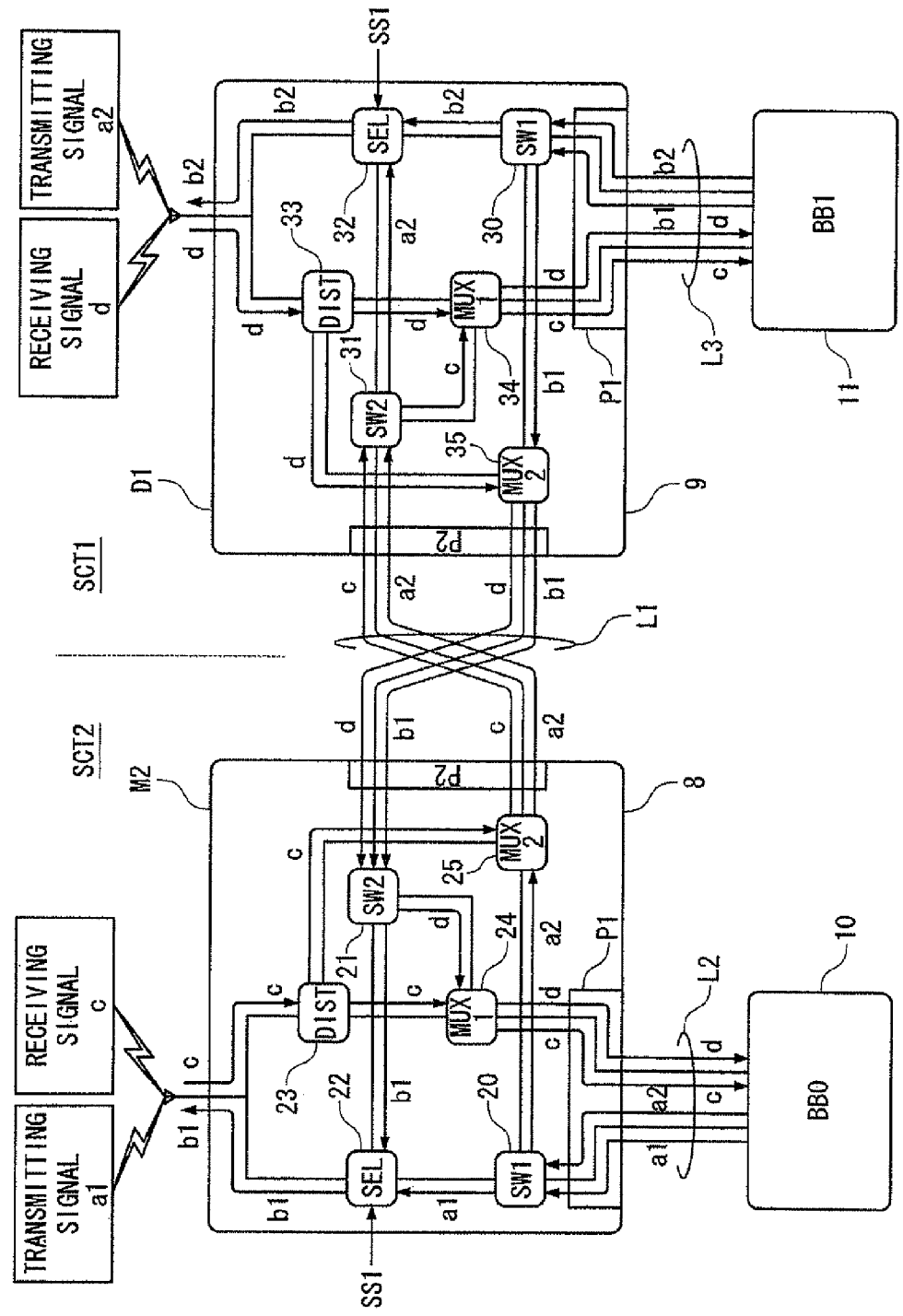
FIG. 7 is a block diagram showing an operation example (2) of system 1 baseband unit in an active state described in FIG. 4B.

Operation Example (2) (when the Baseband Unit BB1 (11) of System 1 is in an Active State): FIG. 7

This operation example corresponds to the basic operation example shown in FIG. 4B. This time, when receiving the system 1 operation signal SS1 the radio transceiver D1 (9) is set to the active state. When receiving the system 1 operation signal SS1, the radio transceiver M2 is set to the standby state.

Therefore, the thing that is different from the operation example (1) shown in FIG. 6 is an operation of the selector SEL in each of the radio transceiver M2 (8) and D1 (9).

That is, when the system 1 operation signal SS1 is provided the selector SEL 32 in the radio transceiver D1 (9) preferentially selects the downward direction signal "b2" of the downward direction signal "b2" from the switch SW1 (30) and the downward direction signal "a2" from the switch SW2 (31), and transmits the signal "b2" as a transmission signal in the sector SCT1.

Likewise, when the system 1 operation signal SS1 is provided, the selector SEL 22 in the radio transceiver M2 (8) selects the downward direction signal "b1" of the downward direction signal "a1" from the switch SW1 (20) and the downward direction signal "b1" from the switch SW2 (21), and transmits the signal "b1" as a transmission signal in the sector SCT2.

The upward direction signals "c" and "d" are received both in the baseband unit BB0 (10) and BB1 (11), because the same operation as the operation example (1) described above is performed.

Figure 8:
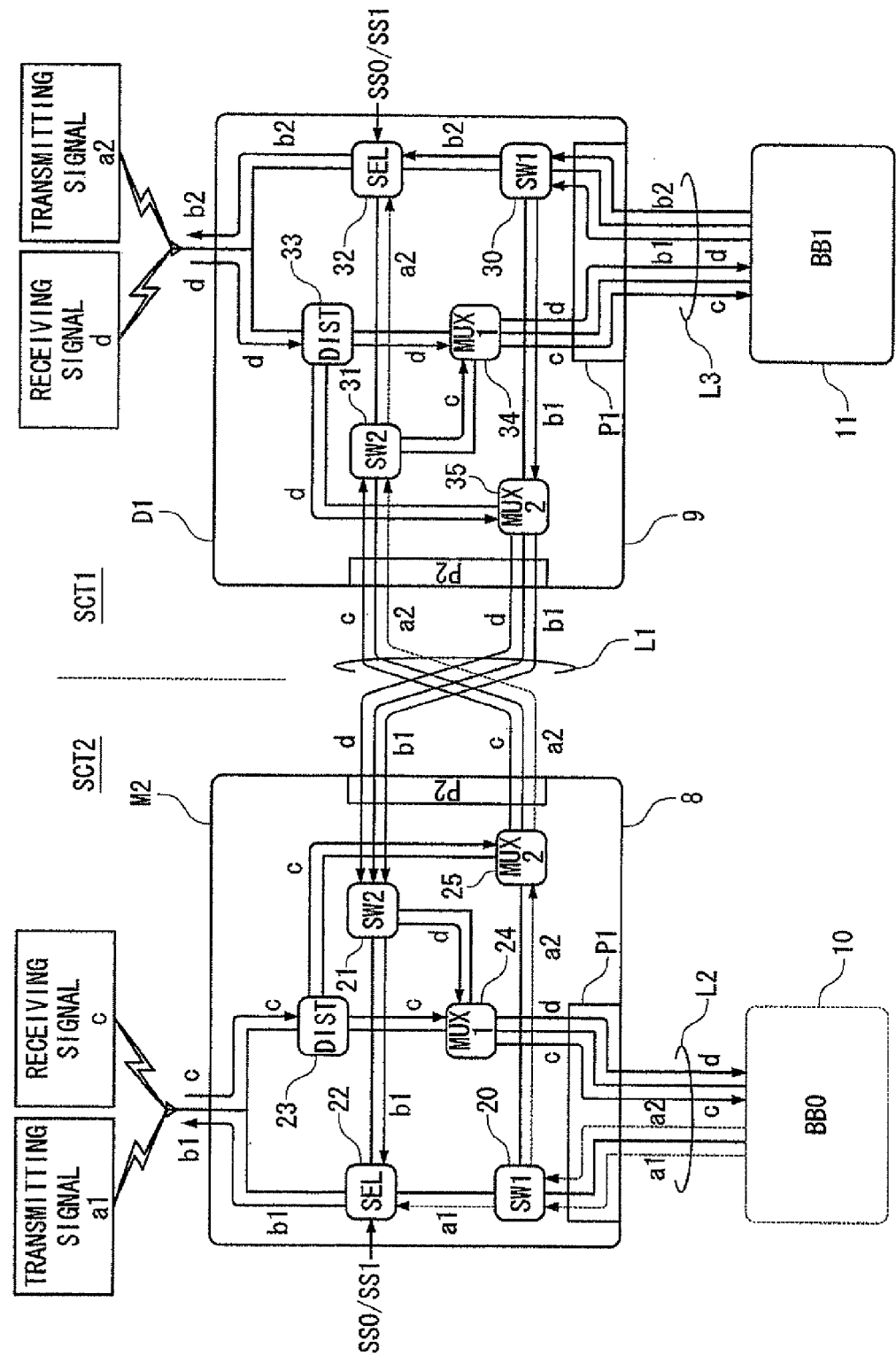
FIG. 8 is a block diagram showing an operation example (3) of system 0 baseband unit in case of failure.

Operation Example (3) (when the Baseband Unit BB0 of System 0 is in the Failure State): FIG. 8

In case of the operation example (3), the baseband unit BB0 (10) of system 0 falls into the failure state. Therefore, the upward direction signals "a1" and "a2" in the operation example (1) and (2) shown in FIG. 6 and FIG. 7 indicate the failure state. The failure state is shown with a dotted line in the figure.

Therefore, when the downward direction signals "a1" and "a2" indicate the failure state, if the selector SEL 22 in the radio transceiver M2 (8) is given the downward direction signal "a1" from the switch SW1 (20), the selector SEL 22 determines that the baseband unit BB0 (10) is in the failure state and selects the downward direction signal "b1", and transmits the signal "b1" as a transmission signal in the sector SCT2.

Since the downward direction signal "a2" indicates the failure state of the baseband unit BB0 (8) in the selector SEL 32, the selector SEL 32 in the radio transceiver D1 (9) becomes aware of the failure state of the baseband unit BB0 (10). Thus, the selector SEL 32 selects the downward direction signal "b2" from the switch SW1 (30) and transmits the signal "b2" as a transmission signal in the sector SCT1.

That is, both of the selector SELs in the radio transceiver M2 (8) and D1 (9) output the normal signal, no matter whether the operation signal is the system 0 or the system 1.

Otherwise, the operation is the same as the operation examples (1) and (2) described above.

Figure 9:
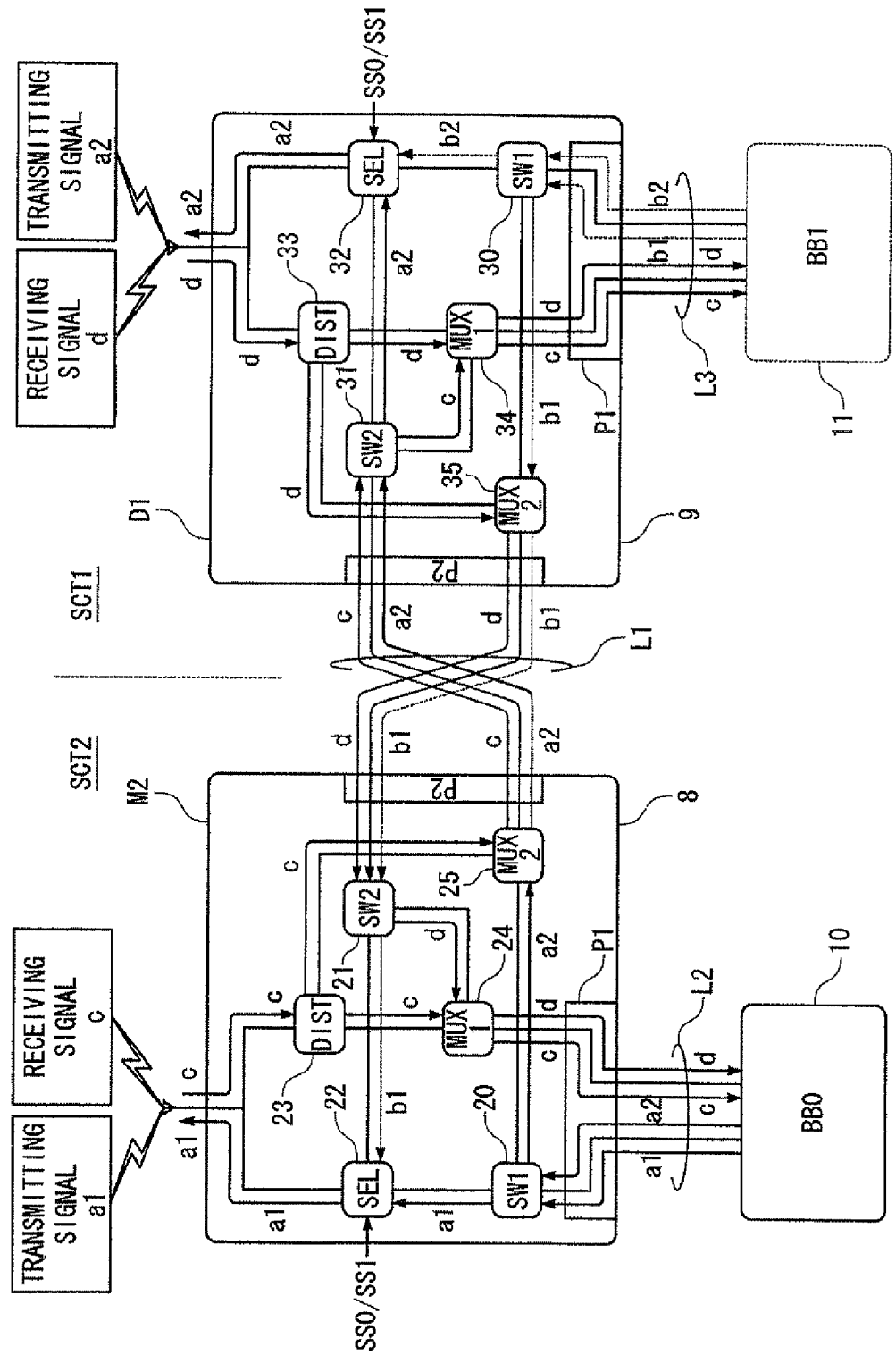
FIG. 9 is a block diagram showing an operation example (4) of system 1 baseband unit in case of failure.

Operation Example (4) (when the Baseband Unit BB1 (11) of System 1 is in the Failure State): FIG. 9

In case of the operation example (4), the thing that is different from the operation example (3) is that the baseband unit BB1 (11) of system 1, instead of the baseband unit BB0 (10) of system 0, falls into the failure state.

Therefore, in the radio transceiver D1 (9), if the selector SEL 32 is given the downward direction signal "b2" from the switch SW1 (30), the selector SEL 32 determines that the baseband unit BB1 (11) is in the failure state and selects the downward direction signal "a2" from the switch SW2 (31), since the downward direction signals "b1" and "b2" indicate the failure state. The selector SEL 32 then sends the signal "a2" as a transmission signal in the sector SCT1.

In the radio transceiver M2 (8), since the downward direction signal "b1" from the switch SW2 (21) in the selector SEL also indicates the failure state of the baseband unit BB1 (11), the selector SEL 22 becomes aware of the failure state. Therefore, the selector SEL 22 selects the downward direction signal "a1" from the switch SW1 (20) and transmits the signal "a1" as a transmission signal in the sector SCT2.

Otherwise, the operation is the same as the operation example (3).

The present invention is not limited to the above-described embodiment. It is obvious that, based on the description of the patent claim, various changes can be made by the party.

The number of cables is controlled in the embodiments described above.

For example, the number of cables required to connect the first baseband unit, the first radio transceiver, the second radio transceiver and the second baseband unit are three. Thus, it is possible to realize simple construction in comparison with the example in the previous technology.

In the case described above, of the first downward direction signal which is sent to the first radio transceiver and the third downward direction signal from the second radio transceiver, the first radio transceiver is able to select the third downward direction signal and then send the third downward direction signal as a transmission signal, although the first baseband is in the active state, if the first downward direction signal transmitted to itself indicates a failure state.

Each one of the radio transceivers can select the first downward direction signal and transmits the first downward direction signal as a transmission signal when the baseband unit on the side of itself is operating normally. However, in an abnormal case, each one of the radio transceiver can select the third downward direction signal from the other radio transceiver and sends the third downward direction signal as a transmission signal.

As for the upward direction signal, each of the radio transceivers sends the upward direction signal to the baseband unit on the side of itself regardless of whether or not it is operated, whether or not there is a failure, and also sends the upward direction signal to the other baseband unit via the other radio transceiver.

When each of the radio transceivers is placed in one sector, if both units have a failure, communication can not be made in the sector However, when the respective radio transceivers are placed in different sectors, communication can be saved by the other radio transceiver of the sector even if both units have a failure.

The downward direction signal and the upward direction signal can include connection failure information in signal information to be transmitted.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, failing within the scope thereof.

What is claimed is:

1. A wireless base station, comprising:
    a first radio transceiver in a first sector and a second radio transceiver in a second sector, the second radio transceiver connected to the first transceiver with a communication cable;
    a first baseband unit connected to the first radio transceiver with a first baseband communication cable; and
    a second baseband unit connected to the second radio transceiver with a second baseband communication cable,
    wherein the first radio transceiver is able to transmit a signal received from the first baseband unit to the first sector and also is able to transfer the signal received from the first baseband unit to the second radio transceiver, and the second radio transceiver is able to transmit a signal received from the second baseband unit to the second sector, and also is able to transfer the signal received from the second baseband unit to the first radio transceiver.

2. The wireless base station according to claim 1, wherein the first radio transceiver is able to transmit a signal received from the first baseband unit as a downward direction signal, and also is able to transfer the signal received from the first baseband unit to the second radio transceiver, and the second radio transceiver is able to transmit a signal received from the second baseband unit as a downward direction signal, and also is able to transfer the signal received from the second baseband unit to the first radio transceiver.

3. The wireless base station according to claim 1, wherein the first radio transceiver selects a signal received from the first baseband unit prior to the signal received from the second baseband unit by transfer.

4. A wireless base station, comprising:
    a first radio transceiver in a first sector and a second radio transceiver in a second sector, the second radio transceiver connected to the first radio transceiver with a communication cable; and
    a first baseband unit connected to the first radio transceiver and a second baseband unit connected to the second radio transceiver, wherein
    the first radio transceiver selects a first signal received from the first baseband unit prior to a third signal received from the second baseband unit via the second radio transceiver and transmits the first signal in a sector when the first baseband unit is in active state and the first radio transceiver transfers a second signal received from the first baseband unit to the second radio transceiver which transmits the second signal in a sector.

5. The wireless base station according to claim 4, wherein the first radio transceiver selects the third signal received from the second baseband unit via the second radio transceiver prior to the first signal received from the first baseband unit and transmits the third signal when the second baseband unit is in an active state.

6. The wireless base station according to claim 4, wherein the first radio transceiver selects the third signal as the downward direction signal when the first downward direction signal indicates a failure state.

7. The wireless base station according to claim 4, wherein the first radio transceiver distributes a received upward direction signal to a first upward direction signal and a second upward direction signal, and also sends the first upward direction signal and a third upward direction signal transferred from the second radio transceiver to the first baseband unit.

8. The wireless base station according to claim 4, wherein the upward direction signals are able to include connection failure information.

9. A wireless base station, comprising:
providing a first radio transceiver in a first sector and a second radio transceiver in a second sector;
connecting the second radio transceiver to the first transceiver;
connecting a first baseband unit to the first radio transceiver;
connecting a second baseband unit to the second radio transceiver;
transmitting a signal received from the first baseband unit by the first radio transceiver as a downward direction signal;
transferring the signal received from the first baseband unit by the first radio transceiver to the second radio transceiver;
transmitting a signal received from the second baseband unit by the second radio transceiver as a downward direction signal; and
transferring the signal received from the second baseband unit by the second radio transceiver to the first radio transceiver.

10. A method of wireless communication, comprising:
providing a first radio transceiver in a first sector;
providing a second radio transceiver in a second sector;
connecting the second radio transceiver to the first radio transceiver; and
connecting a first baseband unit to the first radio transceiver;
connecting a second baseband unit to the second radio transceiver;
selecting a first signal received from the first baseband unit by the first radio transceiver;
receiving a third signal from the second baseband unit by the first radio transceiver via the second radio transceiver;
transmitting the first signal in a sector when the first baseband unit is in active state; and
transferring a second signal received from the first baseband unit by the first radio transceiver to the second radio transceiver; and
transmitting the second signal in the sector by the second radio transceiver.

11. a wireless base station, comprising:
a first radio transceiver in a first sector and a second radio transceiver in a second sector, the second radio transceiver coupled to the first radio transceiver with a communication cable;
a first baseband unit coupled to the first radio transceiver with a first baseband communication cable; and
a second baseband unit coupled to the second radio transceiver with a second baseband communication cable,
wherein the first radio transceiver is able to transfer a signal received from the first sector to the first baseband unit and also is able to transfer the signal received from the first sector to the second radio transceiver, and the second radio transceiver is able to transfer a signal received from the second sector to the second baseband unit, and also is able to transfer the signal received from the second sector to the first radio transceiver.

* * * * *

UNITED STATES PATENT AND TRADEMARK OFFICE
CERTIFICATE OF CORRECTION

| | | |
|---|---|---|
| PATENT NO. | : 8,050,718 B2 | Page 1 of 1 |
| APPLICATION NO. | : 12/028500 | |
| DATED | : November 1, 2011 | |
| INVENTOR(S) | : Naoyuki Saitou et al. | |

It is certified that error appears in the above-identified patent and that said Letters Patent is hereby corrected as shown below:

Column 12, Line 17, In Claim 11, delete "a" and insert -- A --, therefor.

Signed and Sealed this
Thirty-first Day of January, 2012

David J. Kappos
*Director of the United States Patent and Trademark Office*